United States Patent [19]

Audeh

[11] Patent Number: 4,786,483

[45] Date of Patent: Nov. 22, 1988

[54] PROCESS FOR REMOVING HYDROGEN SULFIDE AND MERCURY FROM GASES

[75] Inventor: Costandi A. Audeh, Princeton, N.J.

[73] Assignee: Mobil Oil Corporation, New York, N.Y.

[21] Appl. No.: 100,869

[22] Filed: Sep. 25, 1987

[51] Int. Cl.⁴ .............................................. B01D 53/34
[52] U.S. Cl. .................................... 423/210; 252/184; 252/186.32; 423/224; 423/230; 423/573.1
[58] Field of Search ............... 423/210, 224, 230, 513, 423/573 R, 573 G; 55/72; 252/184, 186.27, 186.32

[56] References Cited

U.S. PATENT DOCUMENTS 4,070,300 1/1978 Moroni et al. ...................... 502/400

FOREIGN PATENT DOCUMENTS 628225 9/1961 Canada ................................. 423/513
77894 6/1977 Japan .............................. 423/573 G

OTHER PUBLICATIONS

A Comprehensive Treatise On Inorganic and Theoretical Chemistry, Mellor, Longmans, Green and Co., 1946, vol. IV, p. 757.

Primary Examiner—John Doll
Assistant Examiner—Jeffrey Edwin Russel
Attorney, Agent, or Firm—Alexander J. McKillop; Michael G. Gilman; Charles J. Speciale

[57] ABSTRACT

Disclosed is a sorbent material for removing mercury and hydrogen sulfide from gases. The sorbent is a porous granular material which has been impregnated with a chemical compound capable of converting mercury to the oxide form and simultaneously hydrogen sulfide to elemental sulfur. Sorbent materials include silica, alumina, silica-alumina, molecular sieves, and mixtures of two or more of these. The reactive compound disclosed is an alkali metal peroxomonosulfate salt, for example, potassium peroxomonosulfate. In a variation the gas can be contacted directly with an aqueous solution of the chemical compound such as the alkali peroxomonsolufate salt.

26 Claims, No Drawings

PROCESS FOR REMOVING HYDROGEN SULFIDE AND MERCURY FROM GASES

NATURE OF THE INVENTION

This invention relates to a method for purifying and removing both small amounts of mercury and hydrogen sulfide from gases, particularly natural gas.

PRIOR ART

Gas produced from some natural gas filed contains hydrogen sulfide and small amounts of mercury. Both hydrogen sulfide and mercury are undesirable components of the gas and must be removed. Ordinarily hydrogen sulfide is recovered by contacting the gas with an absorptive liquid such as an industrial amine and subsequently heating the liquid and stripping it to recover the amine for reuse. Mercury is removed separately by another process wherein the mercury-laden gas is contacted with activated carbon which has been impregnated with sulfur or some other adsorption means such as copper sulfide.

The processing of natural gas in LNG plants requires contact of mercury-laden natural gas with equipment made primarily of aluminum. This is particularly true after the processing steps of treating the gas to remove carbon dioxide and hydrogen sulfide when the gas is chilled or cooled in aluminum-constructed the exchangers. Aluminum heat exchangers represent a capital investment of several million dollars. Damage to these exchangers is to be avoided if at all possible. Although the concentration of mercury in natural gas appears low, the effect of mercury is cumulative as it amalgamates with the aluminum. The result can be damage to the system, particularly the heat exchangers, such as corrosion cracking leading to equipment failure. Repair is correspondingly difficult because of damage to the welded seams of the aluminum. Replacement of the heat exchangers in an LNG plant represents a large expenditure.

A primary object of this invention is to provide an improved process for removing in a single step both hydrogen sulfide and trace quantities of mercury present in a gas, particularly a natural gas.

SUMMARY OF THE INVENTION

Briefly stated, this invention comprises removing the hydrogen sulfide present and reducing the concentration of mercury in a gas by flowing the gas in contact with a mass of an absorbent medium comprising a granular material such as silica, alumina, silica-alumina, molecular sieves, and mixtures, thereof which has been impregnated with a compound which reacts with the mercury to form mercuric oxide and simultaneously with the hydrogen sulfide to form and deposit elemental sulfur. Such compounds are the peroxomonosulfate alkali salts, such as potassium peroxomonosulfate ($KHS_{O5}$). In another aspect this invention comprises the sorbent product formed by impregnating a porous medium with a dry alkali peroxomonosulfate salt.

DESCRIPTION OF THE INVENTION

The initial consideration in the practice of the invention herein is the preparation of the absorptive porous medium through which the mercury-laden, hydrogen sulfide polluted gas is to be flowed. The absorptive medium preferably is a porous one which has been molded or formed into pellet size for ease of handling. The pelletized material is first dried at a temperature calculated to expel any moisture present and is then cooled. Next the dried, pelletized adsorptive material is saturated with or otherwise contacted with an aqueous solution of the alkali peroxomonosulfate. The aqueous solution preferably contains between 1 and 25 percent by weight of the alkali peroxomonosulfate salt. The porous medium is selected from such materials as alumina, silica, silica-alumina and molecular sieves. After the porous medium has been contacted with the aqueous solution for a sufficient period, the porous material is dried under conditions that will not result in decomposition of the salt. It is preferred that the dry sorbent composition contain between 1 and 25 percent by weight of the alkali peroxomonosulfate salt.

The gas to be treated is introduced into a packed bed or tower containing the above described sorbent material and is flowed through the mass of porous material preferably at temperatures of 60° to 190° F. A flow rate of 1 to 30 volume/hourly/space velocity is preferred, as well as a pressure of 1 to 100 atmosphere.

Gases to be treated according to this invention ordinarily will comprise natural gas although other gases such as nitrogen or other nonreactive gases contaminated with mercury and hydrogen sulfide may also be treated in this manner.

In a modification of the invention gas to be treated to remove mercury and hydrogen sulfide pollutants can be contacted directly with an aqueous solution of the alkali peroxomonosulfate by bubbling the gas through the aqueous solution or flowing the gas countercurrently to a stream of the aqueous solution in a bubble column or the like. The preferred method and best mode, however, is the process of contacting the gas with the granular material impregnated with a peroxomonosulfate alkali salt.

EXAMPLES

Examples 1 and 2, immediately following, illustrate the reduction of the mercury content of a gas by potassium peroxomonosulfate, and the conversion of mercury to mercuric oxide, respectively.

EXAMPLE 1

Nitrogen gas containing 1.03 micrograms per cubic meter of mercury was treated by bubbling it through an aqueous solution containing 10 percent by weight of potassium peroxomonosulfate. The effluent gas was determined to have a mercury content of 0.2 micrograms per cubic meter.

EXAMPLE 2

A 10-cc aliquot portion of the aqueous potassium peroxomonosulfate solution used in Example 1 was mixed with about 0.2 gram of elemental mercury and shaken vigorously so as to form small particles of liquid mercury. These small particles were converted to the insoluble yellow mercuric oxide.

EXAMPLE 3

An aqueous solution containing 0.1 percent of sodium sulfide was mixed with 1 cc. of an aqueous solution of cadmium chloride. The resulting characteristic yellow precipitate of cadmium sulfide demonstrated the prsence of sulfide anion in the aqueous solution.

EXAMPLE 4

A few drops of the aqueous solution of potassium peroxomonosulfate used in Examples 1 and 2 were added to separate 10-cc aliquot portions of the aqueous sodium sulfide solution of Example 3. A cloudy suspension of free sulfur resulted. The sulfur was allowed to settle and then a few drops of cadmium chloride solution were added to each of the portions. No characteristic yellow precipitate of cadmium sulfide formed indicating that the sulfide anion had been depleted.

EXAMPLE 5

This example illustrates formation of the sorbent composition of this invention. Alumina extrudate was calcined at 500° C. and then cooled to room temperature in a flowing stream of argon gas. The calcined alumina was then mixed with a sufficient volume of a 25 percent aqueous solution of potassium peroxomonosulfate and dried in a vacuum oven to give an adsorbent containing 25 per cent by weight of dry potassium peroxomonosulfate in the total dried composition.

EXAMPLE 6

A 20-gram quantity of the adsorbent prepared in example 5 was used to treat 1 liter of gas containing 80 micrograms of mercury per cubic meter and 50 ppm of hydrogen sulfide. The effluent gas contained 16 micrograms of mercury per cubic meter and no detectable hydrogen sulfide. The absence of hydrogen sulfide was shown by the absence of the odor of rotten eggs and was confirmed by a negative reaction with lead acetate and cadmium chloride.

EXAMPLE 7

Example 6 was repeated. Ten (10) liters of gas corresponding to that tested in Example 6 was treated with the adsorbent of Example 5 and the treated gas was tested for mercury and sulfide content. The mercury content of the gas after treatment was determined to be 3.4 micrograms per cubic meter and no hydrogen sulfide was detectable.

EXAMPLE 8

Example 6 was again repeated. Sixteen (16) liters of the same gas was treated with the absorbent and the treated gas tested. The mercury content of the gas after treatment was determined to be 1.4 micrograms per cubic meter and no hydrogen sulfide was detectable.

EXAMPLE 9

Example 6 was again repeated. Twenty-one (21) liters of gas were treated by the adsorbent and the treated gas tested. The mercury content of the gas after treatment was determined to be 0.3 micrograms per cubic water and no hydrogen sulfide was detected.

Examples 6 to 9 demonstrate that hydrogen sulfide can be removed and the mercury concentration concurrently reduced in a gas treating process. These examples also demonstrate the continuing improvement in the ability of the adsorbent to remove more mercury with more exposure to the contaminated gas, rather than a reduction in the ability to remove mercury.

I claim:

1. A process for preparing a sorbent composition adapted to the removal of hydrogen sulfide and mercury from a gas passed therethrough comprising:
   (a) contacting a porous sorbent material with an aqueous solution of an alkali metal peroxomonosulfate compound capable of converting both mercury to its oxide form and simultaneously hydrogen sulfide to elemental sulfur; and
   (b) drying the resultant solution-impregnated porous material under conditions that will not result in decomposition of said alkali metal peroxomonosulfate compound.

2. The process of claim 1 wherein the porous material is selected from the group consisting of alumina, silica, silica-alumina, and molecular sieves.

3. The process of claim 1 wherein the porous material is alumina.

4. The process of claim 1 wherein the alkali metal peroxomonosulfate compound is potassium peroxomonosulfate.

5. The process of claim 1 wherein the aqueous solution contains between about 1 and about 25 percent by weight of said alkali metal peroxomonosulfate compound.

6. A composition adapted to the removal of hydrogen sulfide and mercury from a gas passed therethrough prepared by:
   (a) contacting a porous sorbent material with an aqueous solution of an alkali metal peroxomonosulfate capable of converting mercury to its oxide form and simultaneously hydrogen sulfide to elemental sulfur; and
   (b) drying the resultant solution-impregnated porous material under conditions that will not result in decomposition of said alkali metal peroxomonosulfate compound.

7. The composition of claim 6 wherein the porous material is selected from the group consisting of alumina, silica, silica-alumina, and molecular sieves.

8. The composition of claim 6 wherein the porous material is alumina.

9. The composition of claim 6 wherein the alkali metal peroxomonosulfate compound is potassium peroxomonosulfate.

10. The composition of claim 6 wherein the aqueous solution contains between about 1 and about 25 percent by weight of peroxomonosulfate salt.

11. The composition of claim 6 containing between about 1 and 25 percent by weight of the peroxomonosulfate salt.

12. A process for removing hydrogen sulfide and mercury from a gas comprising flowing said gas through a permeable mass of sorbent material prepared by:
   (a) contacting a porous sorbent material with an aqueous solution of an alkali metal peroxomonosulfate compound capable of converting mercury to its oxide form and simultaneously hydrogen sulfide to elemental sulfur; and
   (b) drying the resultant solution-impregnated porous material under conditions that will not result in decomposition of the said alkali metal peroxomonosulfate compound.

13. The process of claim 12 wherein the porous material is selected from the group consisting of alumina, silica, silica-alumina, and molecular sieves.

14. The process of claim 12 wherein the porous material is alumina.

15. The process of claim 12 wherein the alkali metal peroxomonosulfate compound is potassium peroxomonosulfate.

16. The process of claim 12 wherein the aqueous solution contains between about 1 and about 25 percent by weight of peroxomonosulfate salt.

17. The process of claim 12 wherein the gas treated is natural gas.

18. The process of claim 12 wherein the gas is contacted with the porous material at a temperature of between about 60° and about 190° F.

19. The process of claim 12 wherein the pressure in the sorbent bed is between about 1 and about 100 atmospheres.

20. A composition for removing mercury and hydrogen sulfide from a gas comprising a porous sorbent material and means impregnated therein with an alkali metal peroxomonosulfate salt for converting mercury present in a gas to the oxide form and simultaneously converting hydrogen sulfide to elemental sulfur.

21. The composition of claim 20 wherein said porous sorbent material is selected from the group consisting of alumina, silica, silica-alumina, molecular sieves, and mixtures thereof.

22. The composition of claim 20 wherein said means for converting mercury to the oxide form and hydrogen sulfide to elemental sulfur is potassium peroxomonosulfate.

23. A process for removing hydrogen sulfide and mercury from a gas comprising flowing said gas through an aqueous solution of an alkali metal peroxomonosulfate compound capable of converting mercury to its oxide form and simultaneously converting hydrogen sulfide to elemental sulfur and recovering a gas substantially reduced in mercury and hydrogen sulfide content.

24. The process of claim 23 wherein the alkali metal peroxomonosulfate compound is potassium peroxomonosulfate.

25. The process of claim 23 wherein the gas treated is natural gas.

26. The process of claim 23 wherein the aqueous solution contains between about 1 and about 25 percent by weight of peroxomonosulfate salt.

* * * * *